United States Patent
Kikuchi

(10) Patent No.: US 10,326,534 B2
(45) Date of Patent: Jun. 18, 2019

(54) LIGHT-EMITTING APPARATUS, IMAGING APPARATUS, INFORMATION TRANSMISSION SYSTEM AND INFORMATION TRANSMISSION METHOD

(71) Applicant: CASIO COMPUTER CO., LTD., Tokyo (JP)

(72) Inventor: Masaaki Kikuchi, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/852,894

(22) Filed: Dec. 22, 2017

(65) Prior Publication Data

US 2018/0198532 A1 Jul. 12, 2018

(30) Foreign Application Priority Data

Jan. 12, 2017 (JP) ................................. 2017-003085

(51) Int. Cl.
| | | |
|---|---|---|
| *H04B 10/00* | (2013.01) | |
| *H04B 10/66* | (2013.01) | |
| *G06T 7/246* | (2017.01) | |
| *H04B 10/50* | (2013.01) | |
| *H04B 10/116* | (2013.01) | |
| *H04B 10/516* | (2013.01) | |
| *G06T 7/73* | (2017.01) | |

(52) U.S. Cl.
CPC ............. *H04B 10/66* (2013.01); *G06T 7/248* (2017.01); *G06T 7/74* (2017.01); *H04B 10/116* (2013.01); *H04B 10/502* (2013.01); *H04B 10/516* (2013.01)

(58) Field of Classification Search
CPC .... H04B 10/66; H04B 10/516; H04B 10/502; H04B 10/116; G06T 7/74; G06T 7/248
USPC .......................................................... 398/130
See application file for complete search history.

(56) References Cited

U.S. PATENT DOCUMENTS

| | | | | |
|---|---|---|---|---|
| 2010/0265405 A1* | 10/2010 | Toshima | ............... | G09G 3/3426 348/687 |
| 2015/0062414 A1* | 3/2015 | Hirasawa | ............... | H04N 5/238 348/363 |
| 2018/0064323 A1* | 3/2018 | Fujinuma | ........... | A61B 1/00096 |

FOREIGN PATENT DOCUMENTS

| | | |
|---|---|---|
| JP | 2002-10243 A | 1/2002 |
| JP | 2013-236363 A | 11/2013 |
| JP | 2014-75635 A | 4/2014 |
| JP | 2016-158100 A | 9/2016 |

* cited by examiner

*Primary Examiner* — Don N Vo

(74) *Attorney, Agent, or Firm* — Fitch, Even, Tabin & Flannery LLP

(57) ABSTRACT

To easily capture the light emission position of a light-emitting apparatus on the imaging apparatus side, even when the positional relationship of the two changes. A mobile device detects its own speed, and an LED within the mobile device accomplishes light emission in accordance with any out of a first light emission pattern, a second light emission pattern and a third light emission pattern so that the light emission cycle becomes shorter the faster the speed of the mobile device. On the other hand, a server detects the speed of the mobile device from frames obtained through imaging by an imager, and changes the imaging interval of the imager so that the imaging interval becomes longer the slower the speed.

15 Claims, 9 Drawing Sheets

FIG. 8

| R G B | R G B | R G B | R G B | ... | R G B | R G B | R G B |

LIGHT-EMITTING APPARATUS, IMAGING APPARATUS, INFORMATION TRANSMISSION SYSTEM AND INFORMATION TRANSMISSION METHOD

CROSS-REFERENCE TO RELATED APPLICATION

This application claims the benefit of Japanese Patent Application No. 2017-003085, filed on Jan. 12, 2017, the entire disclosure of which is incorporated by reference herein.

FIELD

This application relates generally to a light-emitting apparatus, an imaging apparatus, an information transmission system and an information transmission method.

BACKGROUND

Technology that accomplishes information transmission with visible light as the communication medium has been known from before, as in Unexamined Japanese Patent Application Kokai Publication No. 2013-236363.

SUMMARY

A light-emitting apparatus for emitting light in a light emission mode, in which light is modulated as a communication medium, corresponding to prescribed data, the light-emitting apparatus comprising:
  a light emitter;
  a movement detector that detects movement of the light emitter; and
  a light emission controller that changes the light emission mode of the light emitter, to able to capture a light emission position for the reception of information by an imaging apparatus in accordance with detection results from the movement detector.

An imaging apparatus for imaging with a prescribed imaging interval and receiving light from a light-emitting apparatus that emits light in a light emission mode, in which light is modulated as a communication medium, corresponding to prescribed data, the imaging apparatus comprising:
  an imager;
  an decoder that decodes prescribed data from light, emitted by the light-emitting apparatus, included in the image imaged by the imager;
  a movement detector that detects movement of an image of light, included in the image imaged by the imager, from a plurality of images acquired through imaging with the prescribed imaging interval by the imager; and
  an imaging interval controller that changes the prescribed imaging interval, in accordance with detection results from the movement detector.

An information transmission system for modulating light as a communication medium and transmitting prescribed data between a light-emitting apparatus and an imaging apparatus, the information transmission system comprising the light-emitting apparatus and the imaging apparatus wherein:
  the light-emitting apparatus comprises:
    a light emitter;
    a first movement detector that detects movement of the light emitter;
    a determiner that determines whether or not to use a light emission mode in which the prescribed data is to be included in the light emission mode of the light emitter, in accordance with detection results from the first movement detector; and
    a light emission controller that changes the light emission mode of the light emitter, in accordance with determination results of the determiner; and
  the imaging apparatus comprises:
    an imager;
    an decoder that decodes prescribed data from light, emitted by the light-emitting apparatus, included in the image imaged by the imager;
    an information acquirer that acquires the data from the signal decoded by the decoder;
    a second movement detector that detects movement of an image of light, included in the image imaged by the imager, from a plurality of images acquired through imaging with a prescribed imaging interval by the imager; and
    an imaging interval controller that changes the prescribed imaging interval, in accordance with detection results from the second movement detector.

An information transmission method for emitting light in a light emission mode, in which light is modulated as a communication medium, corresponding to prescribed data, the information transmission method including:
  emitting light;
  detecting movement of the light emission; and
  light emission controlling that changes the light emission mode of the light emission, to able to capture a light emission position for the reception of information by an imaging apparatus in accordance with detection results from the movement detection.

An information transmission method for imaging with a prescribed imaging interval and receiving light from a light-emitting apparatus that emits light in a light emission mode in which light is modulated as a communication medium, corresponding to prescribed data, the information transmission method including:
  imaging;
  decoding prescribed data from light, emitted by the light-emitting apparatus, included in the image imaged in the imaging;
  detecting movement of an image of light, included in the image imaged in the imaging, from a plurality of images acquired through imaging with the prescribed imaging interval in the imaging; and
  imaging interval controlling that changes the prescribed imaging interval, in accordance with detection results from the movement detection.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

A more complete understanding of this application can be obtained when the following detailed description is considered in conjunction with the following drawings, in which:

FIG. 8 is a drawing showing one example of a third light emission pattern according to the embodiment.

DETAILED DESCRIPTION

Below, a visible light communication system will be described as an information processing system according to an embodiment of the present disclosure, with reference to the drawings.

Figure 1:
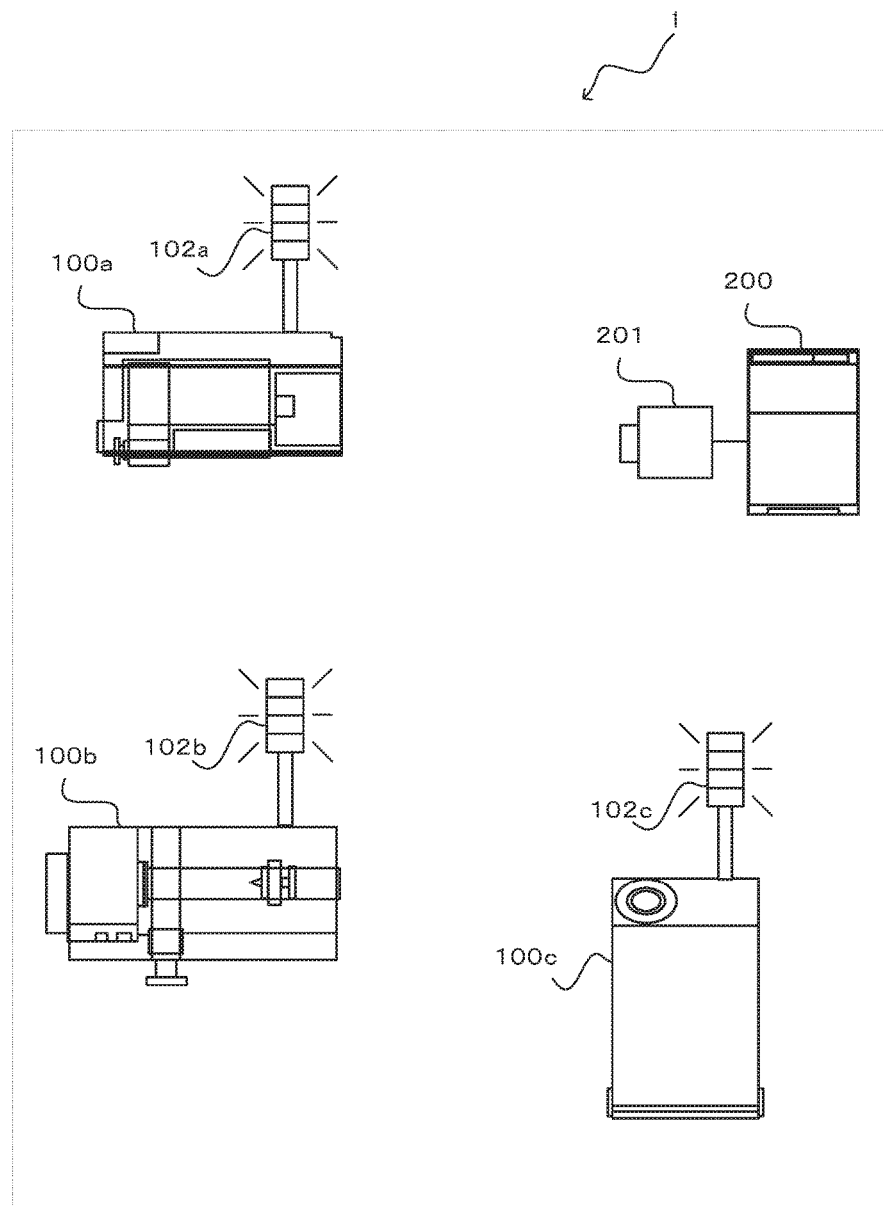
FIG. 1 is a drawing showing one example of a visible light communication system according to an embodiment of the present disclosure.

FIG. 1 is a drawing showing a configuration of a visible light communication system. As shown in FIG. 1, a visible light communication system 1 includes movable devices (mobile devices) 100a, 100b, 100c (properly abbreviated as "mobile device 100" below when not limiting each of the mobile devices 100a, 100b and 100c), and a server 200. The mobile device 100a includes a light-emitting diode (LED) 102a, the mobile device 100b includes an LED 102b and the mobile device 100c includes an LED 102c (below, these are properly abbreviated as "LED 102" when not limiting each of the LEDs 102a, 102b and 102c). The server 200 includes an imager 201. The mobile device 100 corresponds to a light-emitting apparatus, and the server 200 corresponds to an imaging apparatus.

In this embodiment, information is transmitted by the LED 102 within the mobile device 100 emitting light corresponding to information that is a transmission target. On the other hand, with the server 200, the imager 201 within the server 200 accomplishes imaging, obtains information from the image of the light that was obtained through imaging, and also captures the light-emission position of the mobile device 100.

Figure 2:
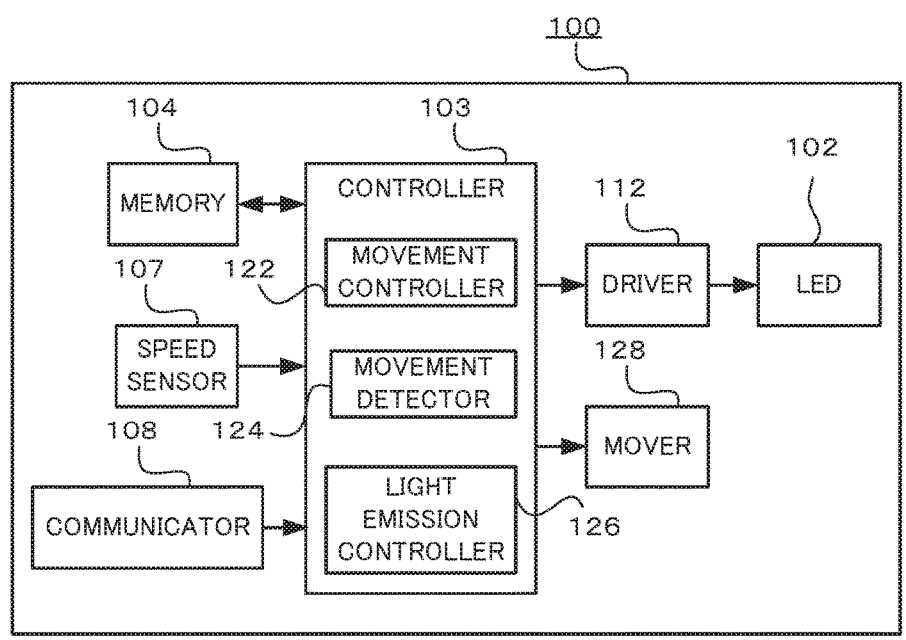
FIG. 2 is a drawing showing one example of a configuration of a mobile device according to the embodiment.

FIG. 2 is a drawing showing one example of a configuration of the mobile device 100. As shown in FIG. 2, the mobile device 100 includes the LED 102, a controller 103, a memory 104, a speed sensor 107, a communicator 108, a driver 112 and a mover 128.

The controller 103 comprises a processor, for example. The controller 103 executes software processing in accordance with programs (for example, a program for realizing the actions of the mobile device 100 shown in below-described FIG. 4) stored in the memory 104, and controls various functions with which the mobile device 100 is equipped.

The memory 104 is for example random access memory (RAM) or read only memory (ROM). The memory 104 stores various types of information (programs and/or the like) used in control in the mobile device 100. The speed sensor 107 detects the speed of the mobile device 100. The communicator 108 is for example a local area network (LAN) card. The communicator 108 accomplishes communication with other communication apparatuses.

The controller 103 comprises a movement controller 122, a movement detector 124 and a light emission controller 126. The movement controller 122 controls movement of the mobile device 100 on the basis of information for mobile control received by the communicator 108. The movement detector 124 determines whether or not the mobile device 100 is moving on the basis of detection results from the speed sensor 107, and when moving, obtains the movement speed thereof. The movement detection target may be the mobile device 100, and when the mobile device 100 and the LED 102 (light emitter) are equipped with a mechanism for relatively changing position, the LED 102 may be the movement detection target. The light emission controller 126 determines the light emission pattern for prescribed light that is emitted, as arbitrary information indicating the change with time of the hue emitted by the LED 102, in accordance with the speed of the mobile device 100. Furthermore, the light emission controller 126 outputs the light emission pattern information determined to the driver 112.

The driver 112 generates a driver signal for causing the hue of light emitted by the LED 102 to change with time, in accordance with the light emission pattern from the light emission controller 126. The LED 102 emits light the hue of which changes with time, in accordance with the driver signal output from the driver 112. The mover 128 is comprised to cause the mobile device 100 to move, and plainly speaking is provided with a motor, a driver circuit and a driver means.

Figure 3:
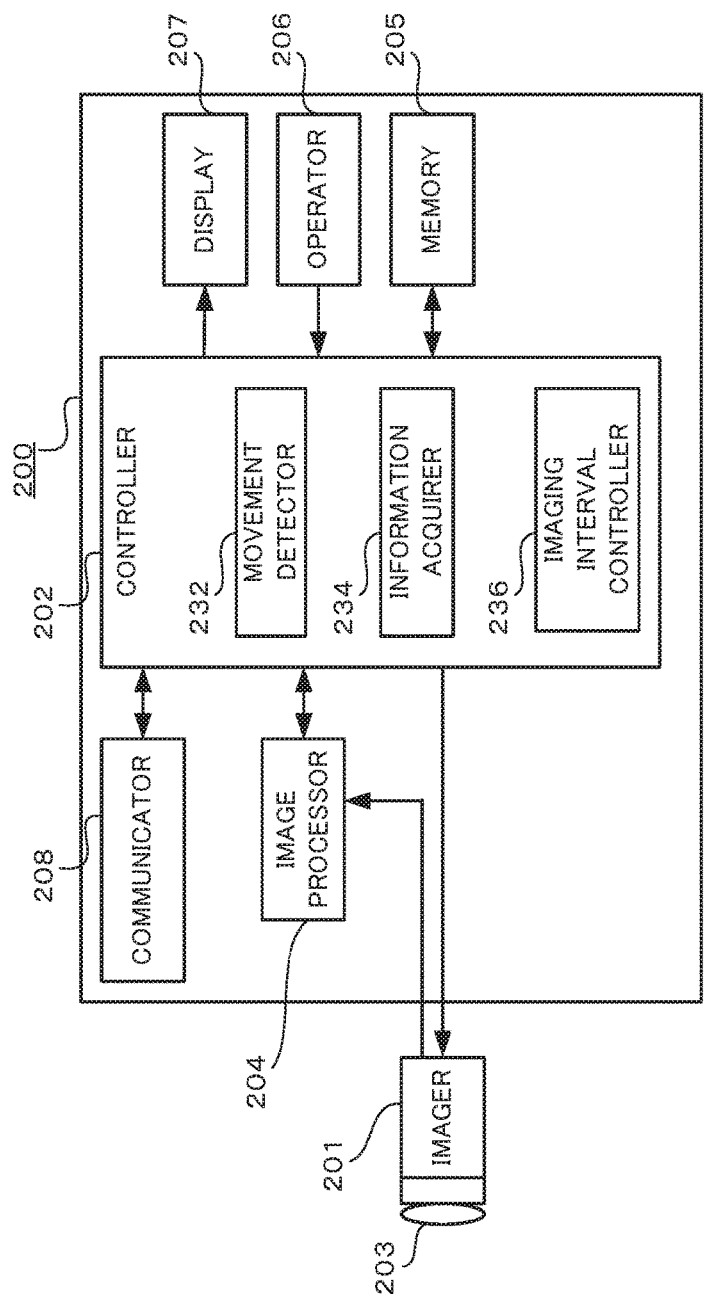
FIG. 3 is a drawing showing one example of a configuration of a server according to the embodiment.

FIG. 3 is a drawing showing one example of a configuration of the server 200. As shown in FIG. 3, the server 200 includes the imager 201, a controller 202, an image processor 204, a memory 205, an operator 206, a display 207 and a communicator 208.

The imager 201 includes a lens 203. The lens 203 comprises a zoom lens and/or the like. The lens 203 moves through a zoom control operation from the operator 206, and through focus control by the controller 202. The imaging angle and the optical image imaged by the imager 201 are controlled by movement of the lens 203.

The imager 201 comprises a plurality of light-receiving elements in a regular two-dimensional arrangement on a light-receiving surface. The light-receiving elements are imaging devices such as charge-coupled devices (CCDs), complementary metal oxide semiconductors (CMOSs) and/or the like. The imager 201 images (receives light of) an optical image incident via the lens 203 at an imaging angle in a prescribed range on the basis of the control signal from the controller 202, converts the imaging signal within that imaging angle into digital data, and generates a frame. In addition, the imager 201 successively accomplishes imaging and frame generation with time, and outputs the successive frames to the image processor 204.

The image processor 204 outputs the frames (digital data) output from the imager 201 to the controller 202 without change, on the basis of a control signal from the controller 202, and also adjusts the image quality and image size of the frames that are to be displayed as through-images on the display 207, and outputs the result to the controller 202. In addition, the image processor 204 has a function that, when a control signal based on a recording instruction operation is input from the operator 206, encodes and files the optical image within the imaging angle in the imager 201 at the point in time when recording was commanded, or the optical image within the display range displayed on the display 207, in compression encoding format such as Joint Photographic Experts Group (JPEG) and/or the like.

The controller 202 comprises a processor, for example. The controller 202 controls the various functions with which the server 200 is equipped, by executing a software process in accordance with programs (for example, a program for realizing the action of the server 200 shown in below-described FIG. 9) stored in the memory 205.

The memory 205 is, for example, ROM or RAM. The memory 205 stores various types of information (programs and/or the like) used in control in the server 200. The communicator 208 is a LAN card, for example. The communicator 208 accomplishes communication with external communication apparatuses.

The operator 206 comprises a ten key, function keys and/or the like, and is an interface used for inputting a user's operation contents. The display 207 comprises, for example, a liquid crystal display (LCD), plasma display panel (PDP), electroluminescence (EL) display and/or the like. The display 207 displays images in accordance with image signals output from the controller 202.

The controller 202 comprises a movement detector 232, an information acquirer 234 and an imaging interval controller 236. The movement detector 232 detects the speed of the mobile device 100 while capturing the light-emission position of the mobile device 100 from the change with time in frames from the image processor 204. The information acquirer 234 determines a light emission pattern in accordance with the speed of the mobile device 100 detected by the movement detector 232. Furthermore, the information acquirer 234 accomplishes information acquisition in accordance with the light emission pattern determined, deeming that the LED 102 within the mobile device 100 emits light the hue of which changes with time in the light emission pattern determined. The imaging interval controller 236 decides the imaging interval by the imager 201 in accordance with the speed of the mobile device 100 detected by the movement detector 232. Furthermore, the imaging interval controller 236 controls the imager 201 so as to image with the imaging interval decided.

Figure 4:
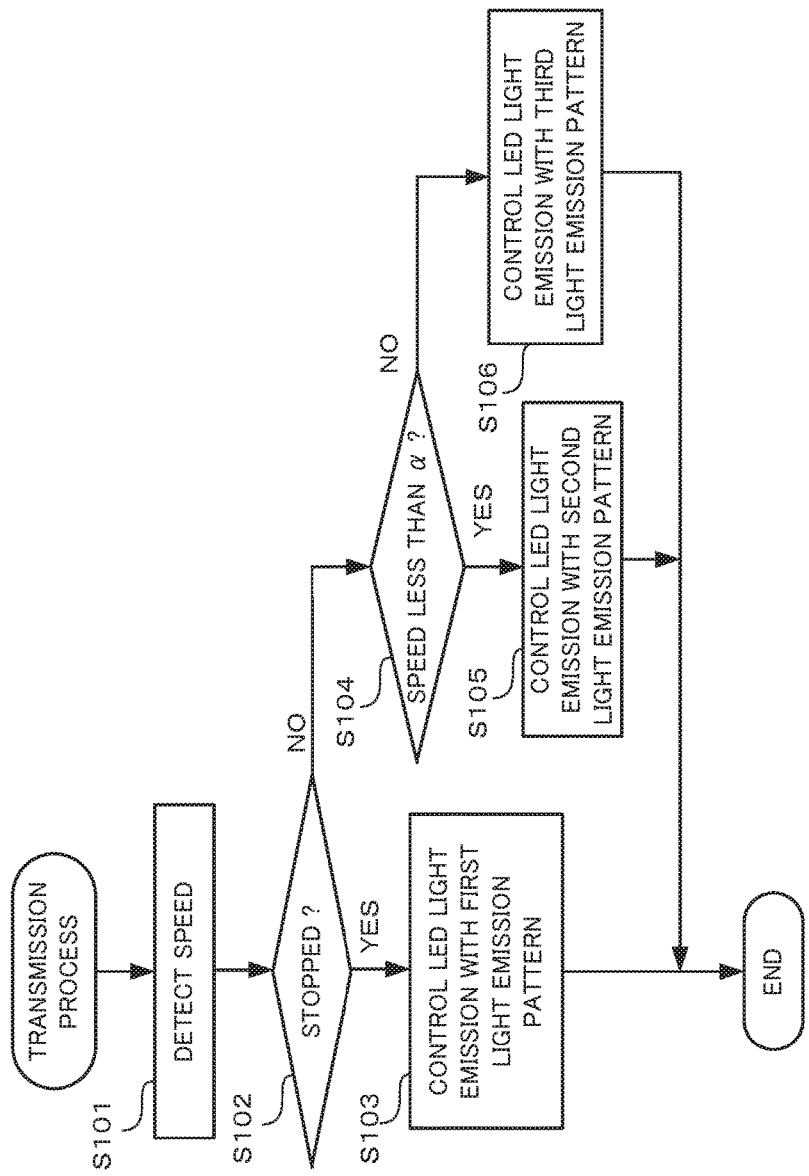
FIG. 4 is a flowchart showing one example the action of a transmission process by the mobile device according to the embodiment.

Next, the action of the visible light communication system 1 will be described. FIG. 4 is a flowchart showing one example of the action of a transmission process by the mobile device 100 within the visible light communication system 1.

The speed sensor 107 within the mobile device 100 detects the speed of the mobile device 100 on the basis of the action of the mover 128, and outputs such to the controller 103 (step S101). The movement detector 124 within the controller 103 acquires the speed of the mobile device 100 from the speed sensor 107. Furthermore, the movement detector 124 determines whether or not the mobile device 100 is stopped, on the basis of the acquired speed of the mobile device 100 (step S102).

When the determination is that the mobile device 100 is stopped (step S102: Yes), the light emission controller 126 within the controller 103 controls the LED 102 so that the LED 102 accomplishes light emission in accordance with a first light emission pattern (step S103). The first light emission pattern is used in order to communicate data of the transmission target, and can also be used to capture the light emission position of the mobile device 100 in the server 200.

Figure 5:
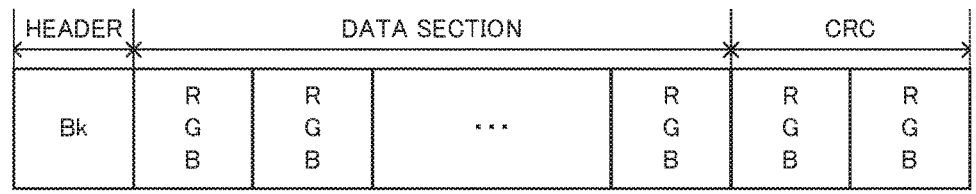
FIG. 5 is a drawing showing one example of a first light emission pattern according to the embodiment.

FIG. 5 is a drawing showing one example of the first light emission pattern. The first light emission pattern in FIG. 5 is such that the light emission frequency (the cycle of light emission in a single hue) is 2 Hz or less. The first light emission pattern includes turning off (Bk) one time as a header, light emission of a prescribed number of any of red (R), green (G) and blue (B) as the data section, and light emission of any of red, green or blue two times as a cyclic redundancy check (CRC) for error correction.

The light emission controller 126 encodes the data of the transmission target (for example, data indicating the state of the mobile device 100) into a bit data string, accomplishes digital modulation on the basis of the bit data string and decides a combination of light emission of any of red, green and blue. Furthermore, the light emission controller 126 assigns the light emission combination that was decided to the data portion of the first light emission pattern and also assigns light emission of the color corresponding to the CRC. Next, the light emission controller 126 outputs the information of the first light emission pattern to the driver 112.

The driver 112 generates a driver signal for causing the hue of the light emitted by the LED 102 to change with time, in accordance with the information of the first light emission pattern from the light emission controller 126. The LED 102 emits light the hue of which changes with time in accordance with the first light emission pattern, on the basis of the driver signal output from the driver 112.

On the other hand, when the determination is that the mobile device 100 is not stopped (step S102: No), the movement detector 124 determines whether or not the speed of the mobile device 100 is less than α, on the basis of the acquired speed of the mobile device 100 (step S104). The value of α here indicates the speed at which reception and capture of the light emission position is possible even if the imager 201 is imaging at a prescribed imaging interval in the server 200, even if the mobile device 100 is moving while transmitting the data of the transmission target.

When the determination is that the speed of the mobile device 100 is less than α (step S104: Yes), the light emission controller 126 controls the LED 102 so that the LED 102 accomplishes light emission in accordance with a second light emission pattern (step S105). The second light emission pattern is used to capture the light emission position of the mobile device 100 in the server 200, and to transmit the data of the transmission target.

Figure 6:
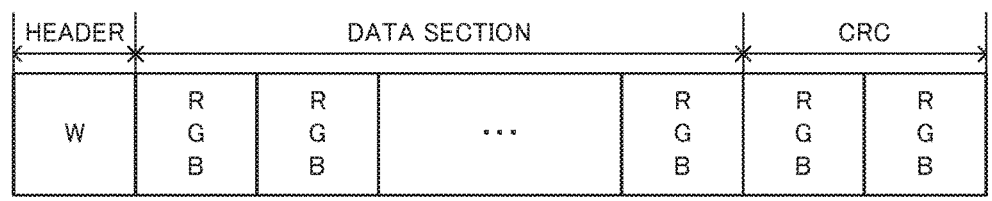
FIG. 6 is a drawing showing one example of a second light emission pattern according to the embodiment.

FIG. 6 is a drawing showing one example of the second light emission pattern. The second light emission pattern shown in FIG. 6 has a light emission frequency of 10 Hz or less. The second light emission pattern includes emission of white (W) one time as a header, light emission of a prescribed number of any of red, green or blue as the data section, and light emission of any of red, green or blue two times as a CRC for error correction.

Figure 7:
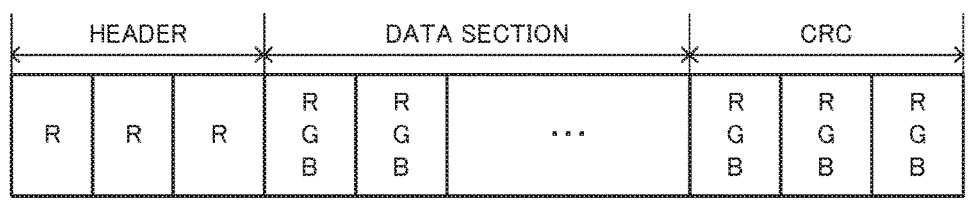
FIG. 7 is a drawing showing another example of the second light emission pattern according to the embodiment.

FIG. 7 is a drawing showing another example of the second light emission pattern. The second light emission pattern shown in FIG. 7 has a light emission frequency of 10 Hz or less. The second light emission pattern includes emission of red three times as a header, light emission of a prescribed number of any of red, green or blue as the data section, and light emission of any of red, green or blue two times as a CRC for error correction.

Similar to the case of the first light emission pattern, the light emission controller 126 encodes the data of the transmission target into a bit data string, accomplishes digital modulation on the basis of the bit data string and decides a combination of light emission of any of the red, green and blue. Furthermore, the light emission controller 126 assigns the light emission combination that was decided to the data portion of the second light emission pattern and also assigns light emission of the color corresponding to the CRC. Next, the light emission controller 126 outputs the information of the second light emission pattern to the driver 112.

The driver 112 generates the driver signal for causing the hue of the light emitted by the LED 102 to change with time, in accordance with the second light emission pattern information from the light emission controller 126. The LED 102 emits light the hue of which changes with time in accordance with the second light emission pattern, on the basis of the driver signal output from the driver 112.

On the other hand, when the determination is that the speed of the mobile device 100 is not less than α (step S104: No), the light emission controller 126 controls the LED 102 so that the LED 102 accomplishes light emission in accordance with a third light emission pattern (step S106). Unlike the above-described first light emission pattern and second light emission pattern, the third light emission pattern is not used in transmission of the data of the transmission target, but is used only in capturing the light emission position of the mobile device 100 in the server 200.

FIG. 8 is a drawing showing one example of the third light emission pattern. The third light emission pattern shown in FIG. 8 has a light emission frequency of 30 Hz or less. The third light emission pattern is such that emission of any of red, green or blue is repeated.

The light emission controller 126 outputs the information of the third light emission pattern to the driver 112. The driver 112 generates a driver signal for causing the hue of light emitted by the LED 102 to change with time, in accordance with the third light emission pattern information from the light emission controller 126. The LED 102 emits light the hue of which changes with time in accordance with the third light emission pattern, on the basis of the driver signal output from the driver 112.

Figure 9:
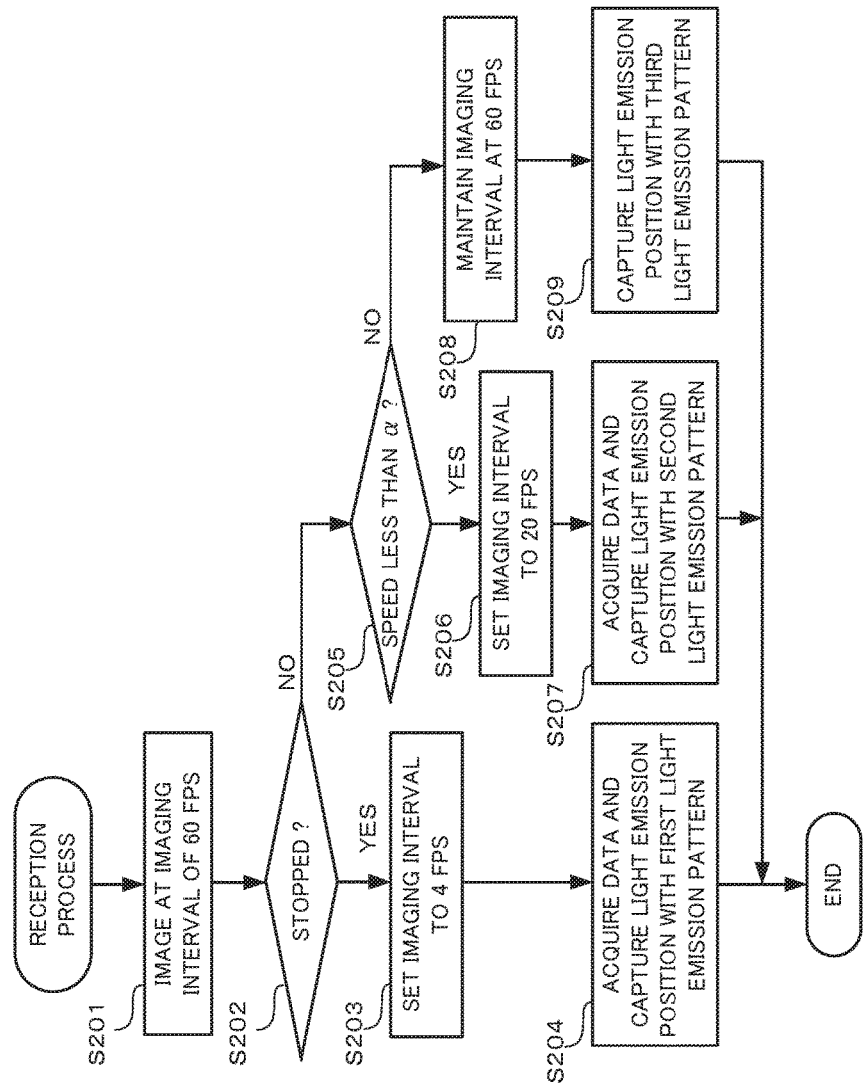
FIG. 9 is a flowchart showing one example of the action of a reception process by the server according to an embodiment of the present disclosure.

Next, the action of the visible light communication system 1 will be described. FIG. 9 is a flowchart showing one example of the action of the reception process by the server 200 within the visible light communication system 1. In the following, the server 200 is assumed to be one that recognizes that the three types of light emission patterns exist, and the LED 102 emits light in the first light emission pattern when the mobile device 100 is stopped, emits light in the second light emission pattern when the mobile device 100 is not stopped but the speed is less than α, and emits light in the third light emission pattern when the speed of the mobile device 100 is at least α.

First, the imaging interval controller 236 within the controller 202 executes control so that the imager 201 accomplishes imaging with an imaging interval of 60 fps. The imager 201 accomplishes imaging with an imaging interval of 60 fps, and generates a frame for each image, under control of the imaging interval controller 236 (step S201).

The image processor 204 outputs the frames (digital data) output from the imager 201 to the controller 202 without change. The movement detector 232 within the controller 202 detects the light emission location of the LED 102 using a commonly known method from the change with time among a plurality of frames from the image processor 204, and detects the speed of the mobile device 100 using a commonly known method from the change in the light emission location of the LED 102 among a plurality of frames. Furthermore, the movement detector 232 determines whether or not the mobile device 100 is stopped, on the basis of the detected speed of the mobile device 100 (step S202).

When the determination is that the mobile device 100 is stopped (step S202: Yes), the imaging interval controller 236 accomplishes control so that the imager 201 accomplishes imaging with an imaging interval of 4 fps (step S203). Here, the reason the imaging interval is taken to be 4 fps is so that all changes in color are detectable when the LED 102 emits light in the first light emission pattern, that is to say when the light emission frequency is 2 Hz or less.

The imager 201 accomplishes imaging with an imaging interval of 4 fps in accordance with control by the imaging interval controller 236, and generates a frame for each image. The image processor 204 outputs the frames output from the imager 201 to the controller 202 without change. The information acquirer 234 within the controller 202 deems that the LED 102 within the mobile device 100 is accomplishing light emission in accordance with the first light emission pattern, on the basis of the fact that a determination was made that the mobile device 100 is stopped.

Next, the information acquirer 234 detects the light emission location corresponding to the data section of the first light emission pattern, out of the light emission locations of the LED 102 in the plurality of frames. Specifically, the information acquirer 234 deems frames where the light emission location is black to be frames corresponding to the header, and determines that the subsequent plurality of frames are light emission locations corresponding to the data section of the first light emission pattern. Furthermore, the information acquirer 234 acquires the original data (data of the transmission target) by executing a decoding process on the basis of the change in color of the light emission location corresponding to the data section of the first light emission pattern in the plurality of frames. Furthermore, the movement detector 232 deems the light emission location of the LED 102 in the plurality of frames to be the position of the mobile device 100 and captures the light emission position (step S204).

On the other hand, when the determination is that the mobile device 100 is not stopped (step S202: No), the movement detector 232 determines whether or not the detected speed of the mobile device 100 is less than α (step S205).

When the determination is that the speed of the mobile device 100 is less than α (step S205: Yes), the imaging interval controller 236 effects control so that the imager 201 accomplishes imaging with an imaging interval of 20 fps (step S206). Here, the imaging interval is made 20 fps so that all of the changes in color are detectable when the LED 102 emits light in the second light emission pattern, that is to say emits light with a light emission frequency of 10 Hz or less.

The imager 201 accomplishes imaging with an imaging interval of 20 fps in accordance with control by the imaging interval controller 236, and generates a frame for each image. The image processor 204 outputs the frames output from the imager 201 to the controller 202 without change. The information acquirer 234 within the controller 202 deems that the LED 102 within the mobile device 100 is accomplishing light emission in accordance with the second light emission pattern, on the basis of the fact that the determination was that the speed of the mobile device 100 is less than α.

Following this, similar to step S204, the information acquirer 234 detects the light emission location corresponding to the data section of the second light emission pattern, out of the light emission locations of the LED 102 in the plurality of frames. Specifically, the information acquirer 234 deems the one frame where the light emission location is white, or the three frames where the light emission location is continuously red, to be frames corresponding to the header, and determines that the subsequent plurality of frames are light emission locations corresponding to the data section of the second light emission pattern. Furthermore, the information acquirer 234 acquires the original data (data of the transmission target) by executing a decoding process on the basis of the change in color of the light emission location corresponding to the data section of the second light emission pattern in the plurality of frames. Furthermore, the movement detector 232 deems the light emission location of the LED 102 in the plurality of frames, in particular the light emission locations corresponding to the header, to be the position of the mobile device 100 and captures the light emission position (step S207).

On the other hand, when the determination is that the speed of the mobile device 100 is not less than α (step S205: No), the imaging interval controller 236 effects control so that the imager 201 accomplishes imaging maintaining an imaging interval of 60 fps (step S208). Here, the imaging interval is taken to be 60 fps so that all of the changes in color are detectable when the LED 102 emits light in the third light emission pattern, that is to say emits light with a light emission frequency of 30 Hz or less.

The imager 201 accomplishes imaging with an imaging interval of 60 fps in accordance with control by the imaging interval controller 236 and generates a frame for each image. The image processor 204 outputs frames output from the imager 201 to the controller 202 without change. The information acquirer 234 within the controller 202 deems that the LED 102 within the mobile device 100 is accomplishing light emission in accordance with the third light emission pattern, on the basis of the fact that the determination was made that the speed of the mobile device 100 is not less than α, that is to say that the speed of the mobile device 100 is at least α.

Next, the information acquirer 234 deems the position of the mobile device 100 to be the light emission location of the LED 102 within the plurality of frames and captures the light emission position (step S209).

In this manner, with this embodiment, the mobile device 100 detects its own speed, and the LED 102 within the mobile device 100 accomplishes light emission in accordance with one out of the first light emission pattern, the second light emission pattern and the third light emission pattern so that the light emission cycle becomes shorter the faster the speed of the mobile device 100. On the other hand, the server 200 detects the speed of the mobile device 100 from the frames obtained through imaging by the imager 201, and controls the imaging interval of the imager 201 so that the imaging interval becomes longer the slower the speed. In this manner, by having the light emission cycle of the LED 102 within the mobile device 100 be longer and the imaging interval of the imager 201 within the server 200 be longer the slower the speed of the mobile device 100, easing of the processing burden caused by light emission and imaging, for example easing power consumption, can be achieved. On the other hand, by having the light emission cycle of the LED 102 within the mobile device 100 be shorter and the imaging interval of the imager 201 within the server 200 be shorter the faster the speed of the mobile device 100 is, the server 200 can stably accomplish capturing of the light emission position of the mobile device 100, even when the speed of the mobile device 100 is fast.

In addition, when the mobile device 100 is stopped, capturing the light emission position in the server 200 is easy, so the first light emission pattern used in transmitting data of the transmission target in the mobile device 100 is also caused to capture the light emission position of the mobile device 100 in the server 200, and when the speed of the mobile device 100 is at least α, capturing the light emission position of the mobile device 100 in the server 200 is difficult, so the third light emission pattern exclusively for capturing the light emission position is used. Through this, transmission of information is accomplished efficiently, and the server 200 can stably accomplish capturing of the light emission position of the mobile device 100.

In addition, when the speed of the mobile device 100 is less than α, the second light emission pattern for capturing the light emission position of the mobile device 100 in the server 200 and transmitting data of the transmission target in the mobile device 100 is used. The second light emission pattern has the black in the header in the first light emission pattern replaced with white, as shown in FIG. 6, or has the black in the header in the first light emission pattern replaced with three reds, as shown in FIG. 7. Consequently, by the server 200 using light emission in the header to capture the light emission position of the mobile device 100, capturing the light emission position can be easily accomplished.

The present disclosure is not limited by the above-described description of the embodiment or the drawings, and the above-described embodiment and drawings can be suitably altered.

For example, in the above-described embodiment, in the server 200 the movement detector 232 within the controller 202 detected the light emission location of the LED 102 using a commonly known method from the change with time among the plurality of frames from the image processor 204, and the speed of the mobile device 100 was detected using a commonly known method from the change in light emission locations of the LED 102 over a plurality of frames. However, detection of the speed of the mobile device 100 is not limited to this, and speed information may be communicated from the mobile device 100 to the server 200 using any communication method. For example, the speed of the mobile device 100 may be acquired by the information on speed in the data section of the light emission pattern being assigned, the LED 102 within the mobile device 100 accomplishing light emission in accordance with the light emission pattern for which information about speed was assigned in the data section, and the server 200 accomplishing a decoding process on the basis of the change in the color of the light emission location corresponding to the data section. In addition, when the mobile device 100 is stopped, the fact that the mobile device 100 is stopped may be recognized by the LED 102 within the mobile device 100 accomplishing light emission in accordance with the light emission pattern in which information indicating stopping is assigned in the data section, and the server 200 accomplishing a decoding process on the basis of the change in the color of the light emission location corresponding to the data section.

In addition, in the above-described embodiment, a description was given for a case in which visible light, namely red, green and blue light, is used for communications, but other colors of visible light may be used, and furthermore, light other than visible light, such as infrared rays and/or the like, may be used. In addition, the composition of light emitted in the first light emission pattern, the second light emission pattern and the third light emission pattern may be the composition of light emission in other light emission patterns, and furthermore, any combination of light emission patterns would be fine, and a combination in chronological order of the combined light emission patterns would also be fine. In addition, the light emission patterns are not limited to those in which the hue changes with time, for ones in which the luminosity (brightness) or the intensity changes with time would be fine. In addition, when the mobile device 100 is moving, the luminosity of the LED 102 may be increased. Through this, capturing the light emission position in the server 200 becomes easier.

In addition, in the above-described embodiment, the lengths of the first light emission pattern and the third light emission pattern (the repeat cycle) is not particularly limited, for using longer light emission patterns the faster the speed of the mobile devices 100 would be fine. Through this, capturing the light emission position in the server 200 becomes easier. In addition, when the mobile device 100 is stopped or is stopped for a fixed interval, the LED 102 may stop emitting light and the fact that light emission is stopped may be communicated by other communication systems to the server 200 and the imager 201 may transition to a power-saving mode, and when light emission resumes, the fact that light emission has resumed may be communicated to the server 200 the same as described above, and the imager 201 may transition to a normal operating mode. Through this, when the mobile device 100 has stopped and capturing the light emission position in the server 200 is unnecessary, unnecessary light emission for capturing the light emission position is not accomplished, so that reducing the processing burden caused by light emission is possible. In addition, reducing the processing burden of by receiving light (imaging) becomes possible.

In addition, the mobile device 100 detected its own speed and the LED 102 within the mobile device 100 accomplished light emission in accordance with any of the first light emission pattern, the second light emission pattern and the third light emission pattern in accordance with the speed of the mobile device 100, but prescribed data contained in the pattern of light emitted may be changed. Through this, transmission of information in accordance with the movement speed of the mobile device 100 becomes possible, and transmission of information can be accomplished efficiently.

In addition, in the above-described embodiment, the light emission pattern (as a light emission mode) that emits predetermined light is determined as arbitrary information indicating the temporal change of the hue emitted from the LED 102. But, as the arbitrary information indicating the temporal change of the hue emitted from the LED 102, the light emission mode for emitting the predetermined light may be determined. Further, the light emission frequency (the period of light emission with one hue) may be set as the light emission mode, and the light emission period of the LED 102 may be set as the light emission mode.

In addition, the light source within the mobile device 100 is not limited to an LED. For example, the light source may comprise a portion of the LCD, PDP, EL display and/or the like comprising the display apparatus.

In addition, the server 200 may be any kind of apparatus as long as an imager is provided and imaging is possible.

In addition, in the above-described embodiment, the programs executed may be loaded and distributed on a non-transitory computer-readable recording medium such as a flexible disk, compact disc read-only memory (CD-ROM), digital versatile disc (DVD), magneto-optical (MO) disc and/or the like, and a system for executing the above-described processes may be configured by installing such programs.

In addition, the programs may be loaded on a disk device and/or the like possessed by a prescribed server on a network such as the Internet and/or the like, and for example may be overlaid on carrier waves and downloaded.

When the above-described functions are realized through allocation by an operating system (OS) or through cooperation between applications and an OS, only the portion other than the OS may be stored and distributed on a medium, and may be downloaded and/or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A light-emitting apparatus for emitting light in a light emission mode, in which light is modulated as a communication medium, corresponding to prescribed data, the light-emitting apparatus comprising:
    a light emitter;
    a movement detector that detects movement of the light emitter; and
    a light emission controller that changes the light emission mode of the light emitter, to able to capture a light emission position for the reception of information by an imaging apparatus in accordance with detection results from the movement detector.

2. The light-emitting apparatus according to claim 1, further comprising a determiner that determines whether or not the prescribed data is to be included in the light emission mode of the light emitter, in accordance with detection results from the movement detector,
    wherein the light emission controller that changes the light emission mode of the light emitter, in accordance with determination results of the determiner.

3. The light-emitting apparatus according to claim 2, wherein when the determiner determines that the prescribed data is to be included, the light emission controller changes the light emission mode of the light emitter so that light is emitted with a prescribed light emission pattern.

4. The light-emitting apparatus according to claim 1, wherein when movement of the light emitter is not detected by the movement detector, the light emission controller changes the light emission mode of the light emitter so that the prescribed data is emitted in a prescribed light emission pattern.

5. The light-emitting apparatus according to claim 2, further comprising a movement speed determiner that, when movement of the light emitter is detected by the movement detector, determines whether a movement speed detected by the movement detector is at least or is less than a prescribed speed; and
    when the movement speed determiner has determined that the movement speed of the light emitter is at least the prescribed speed, the light emission controller changes the light emission mode of the light emitter so that light is emitted with a light emission pattern that does not include the prescribed data.

6. The light-emitting apparatus according to claim 5, wherein when the movement speed determiner has determined that the movement speed of the light emitter is less than the prescribed speed, the light emission controller changes the light emission mode of the light emitter so that light is emitted with a light emission pattern that includes the prescribed data.

7. The light-emitting apparatus according to claim 6, wherein
    a non-emission period during which the light emitter is not caused to emit light is included in the prescribed light emission pattern, and when a determination has been made by the movement speed determiner that the movement speed of the light emitter is less than the prescribed speed, the light emission controller changes the light emission mode of the light emitter so that the non-emission period in the prescribed light emission pattern is replaced with a period of emitting light.

8. The light-emitting apparatus according to claim 6, wherein
a non-emission period during which the light emitter is not caused to emit light is included in the prescribed light emission pattern, and
when a determination has been made by the movement speed determiner that the movement speed of the light emitter is less than the prescribed speed, the light emission controller changes the light emission mode of the light emitter so that the non-emission period in the prescribed light emission pattern is replaced with a period of emitting light in a prescribed color.

9. The light-emitting apparatus according to claim 6, wherein
a light emission cycle of the prescribed light emission pattern is included in the light emission mode, and
the light emission controller changes the light emission cycle of the prescribed light emission pattern in accordance with the movement speed acquired when the movement speed determiner makes a determination.

10. The light-emitting apparatus according to claim 9, wherein the light emission controller shortens the light emission cycle of the prescribed light emission pattern, the faster the movement speed acquired when the movement speed determiner makes a determination.

11. An imaging apparatus for imaging with a prescribed imaging interval and receiving light from a light-emitting apparatus that emits light in a light emission mode, in which light is modulated as a communication medium, corresponding to prescribed data, the imaging apparatus comprising:
an imager;
an decoder that decodes prescribed data from light, emitted by the light-emitting apparatus, included in the image imaged by the imager;
a movement detector that detects movement of an image of light, included in the image imaged by the imager, from a plurality of images acquired through imaging with the prescribed imaging interval by the imager; and
an imaging interval controller that changes the prescribed imaging interval, in accordance with detection results from the movement detector.

12. An information transmission system for modulating light as a communication medium and transmitting prescribed data between a light-emitting apparatus and an imaging apparatus, the information transmission system comprising the light-emitting apparatus and the imaging apparatus wherein:
the light-emitting apparatus comprises:
a light emitter;
a first movement detector that detects movement of the light emitter;
a determiner that determines whether or not to use a light emission mode in which the prescribed data is to be included in the light emission mode of the light emitter, in accordance with detection results from the first movement detector; and
a light emission controller that changes the light emission mode of the light emitter, in accordance with determination results of the determiner; and
the imaging apparatus comprises:
an imager;
an decoder that decodes prescribed data from light, emitted by the light-emitting apparatus, included in the image imaged by the imager;
an information acquirer that acquires the data from the signal decoded by the decoder;
a second movement detector that detects movement of an image of light, included in the image imaged by the imager, from a plurality of images acquired through imaging with a prescribed imaging interval by the imager; and
an imaging interval controller that changes the prescribed imaging interval, in accordance with detection results from the second movement detector.

13. The information transmission system according to claim 12, wherein:
the imaging apparatus further comprises a movement speed acquirer that acquires the movement speed of the image of light, when movement is detected by the second movement detector; and
the imaging interval controller changes the prescribed imaging interval on the basis of the movement speed of the image of light acquired by the movement speed acquirer.

14. An information transmission method of a light-emitting apparatus that emits light in a light emission mode, in which light is modulated as a communication medium, corresponding to prescribed data, the information transmission method including:
emitting light;
detecting movement of the light emission; and
light emission controlling that changes the light emission mode of the light emission, to able to capture a light emission position for the reception of information by an imaging apparatus in accordance with detection results from the movement detection.

15. An information transmission method of an imaging apparatus that images with a prescribed imaging interval and receives light from a light-emitting apparatus that emits light in a light emission mode in which light is modulated as a communication medium, corresponding to prescribed data, the information transmission method including:
imaging;
decoding prescribed data from light, emitted by the light-emitting apparatus, included in the image imaged in the imaging;
detecting movement of an image of light, included in the image imaged in the imaging, from a plurality of images acquired through imaging with the prescribed imaging interval in the imaging; and
imaging interval controlling that changes the prescribed imaging interval, in accordance with detection results from the movement detection.

* * * * *